(12) United States Patent
Kageyama et al.

(10) Patent No.: US 7,800,790 B2
(45) Date of Patent: Sep. 21, 2010

(54) DOCUMENT READING UNIT WITH EASILY REMOVABLE DOCUMENT CONTACT GLASS, AND SCANNER AND IMAGE FORMING APPARATUS USING THE SAME

(75) Inventors: Masayuki Kageyama, Chiba (JP); Shinobu Hirayama, Chiba (JP)

(73) Assignee: Seiko I Infotech Inc. (JP)

( * ) Notice: Subject to any disclaimer, the term of this patent is extended or adjusted under 35 U.S.C. 154(b) by 1237 days.

(21) Appl. No.: 11/362,634

(22) Filed: Feb. 27, 2006

(65) Prior Publication Data

US 2006/0193014 A1 Aug. 31, 2006

(30) Foreign Application Priority Data

Feb. 28, 2005 (JP) .............................. 2005-054171

(51) Int. Cl.
*H04N 1/04* (2006.01)
*H01L 27/00* (2006.01)

(52) U.S. Cl. ........................ 358/474; 358/471; 358/473; 358/501; 358/505; 358/513; 250/208.1; 257/E21.499; 257/E23.002

(58) Field of Classification Search ......... 358/471–498, 358/513, 514, 512, 505, 501; 250/208.1; 257/E23.001–E23.009, E21.499
See application file for complete search history.

(56) References Cited

U.S. PATENT DOCUMENTS

| | | | | |
|---|---|---|---|---|
| 4,734,787 A | * | 3/1988 | Hayashi | 358/409 |
| 4,839,730 A | | 6/1989 | Shirakoshi et al. | 358/294 |
| 4,870,483 A | * | 9/1989 | Nishigaki et al. | 358/512 |
| 5,267,043 A | * | 11/1993 | Rottner et al. | 348/104 |
| 5,442,466 A | * | 8/1995 | Kameyama et al. | 358/498 |
| 5,803,622 A | * | 9/1998 | Mama et al. | 399/4 |
| 5,991,054 A | * | 11/1999 | Hung et al. | 358/474 |
| 6,157,467 A | * | 12/2000 | Tsai | 358/483 |
| 6,639,621 B2 | * | 10/2003 | Tamaru | 347/257 |
| 6,801,343 B1 | * | 10/2004 | Sheng | 358/474 |
| 6,940,623 B2 | * | 9/2005 | Lee et al. | 358/474 |
| 7,554,701 B2 | * | 6/2009 | Hong et al. | 358/474 |
| 7,567,365 B2 | * | 7/2009 | Tsujimoto et al. | 358/474 |
| 7,595,913 B2 | * | 9/2009 | Hirayama | 358/471 |

FOREIGN PATENT DOCUMENTS

| | | |
|---|---|---|
| EP | 01650949 | 4/2006 |
| JP | 62272655 | 11/1987 |
| JP | 11355508 | 12/1999 |
| JP | 2002354197 | 12/2002 |
| JP | 2005 5614 | 1/2005 |

* cited by examiner

*Primary Examiner*—Twyler L Haskins
*Assistant Examiner*—Dennis Dicker
(74) *Attorney, Agent, or Firm*—Adams & Wilks

(57) ABSTRACT

A document reading unit has an image sensor mounted in a box-like support base so that a document can be read by the image sensor through an opening in the support base. A contact glass disposed in the opening covers the image sensor and supports the document while it is being read by the image sensor. Support members coupled to the contact glass are detachably fixed to the support base by fixing screws. The image sensor has two rows of spaced-apart line sensors with the line sensors in one row staggered relative to those in the other row, and the support members are arranged between adjacent pairs of line sensors in each row of line sensors. The contact glass and support members are removable as a unit from the support base.

19 Claims, 5 Drawing Sheets

DOCUMENT READING UNIT WITH EASILY REMOVABLE DOCUMENT CONTACT GLASS, AND SCANNER AND IMAGE FORMING APPARATUS USING THE SAME

BACKGROUND OF THE INVENTION

1. Field of the Invention

The present invention relates to a document reading unit that includes a document support plate, used to support a conveyed document, that is positioned so as to cover an image sensor used for the reading of a document that is conveyed, a scanner and an image forming apparatus.

2. Related Background Art

Conventionally known is a so-called document moving scanner that includes: a conveying unit, for conveying a document; and a document reading unit that, to read a document, is equipped with an image sensor and is located along the conveying path of the conveying unit.

A configuration of this type of scanner is disclosed wherein the image sensor of a document reading unit has a first array and a second array of multiple line sensors arranged widthwise and perpendicular to the direction in which a document is conveyed (see, for example, Japanese Patent Laid-Open Publication No. Sho 60-31357 (FIG. 1(a))).

The document reading unit of such a conventional scanner includes: an image sensor, equipped with multiple line sensors; a box-shaped support base, within which the image sensor is stored and mounted; and a contact glass, which supports a document conveyed to the image sensor by a conveying unit. An opening through which the individual line sensors face the document is formed in the support base. The contact glass is formed as a flat rectangular plate, and is arranged at the opening in the support base so as to cover the image sensor. This contact glass prevents dust from entering the image sensor from the outside, and ensures that the image sensor performs a reliable reading operation.

The contact glass of the document moving scanner must be attached, at the opening in the support base, so that in the document conveying area there is no protruding portion that can abut upon a document that is being conveyed, and so that the conveying of a document by the conveying unit is not interrupted.

Furthermore, the distance between the image sensor and the contact glass must be adjusted so that an accurate focal distance can be obtained for the individual line sensors of the image sensor in the direction perpendicular to the document sliding face of the contact glass. Therefore, in the configuration of the conventional document reading unit, spacers are located between the contact glass and the image sensor, and by employing urging members, such as springs, the image sensor is pressed against the spacers that, in turn, are pressed against the contact glass. Either this, or the image sensor is arranged on the support base and an adjustment mechanism is provided for adjusting the position of the image sensor relative to the contact glass.

In order to satisfy the above described requirement, a fixing member is fixed and secured to the document sliding face of the contact glass. The fixing member positioned outside the document conveying area of the contact glass, and the short sides of the contact glass which are parallel to the direction in which a document is conveyed. One end of the fixing member engages the document sliding face of the contact lens, and screws secure the other end to the support base.

Further, at the opening edge of the support base, a glass support portion, which provides widthwise support for the external edge of the contact glass, is formed perpendicular to the direction in which documents are conveyed. Double-sided adhesive tape is attached to the contact glass longitudinally, that is, widthwise relative to the direction travelled by a document, so that the double-sided adhesive tape can secure the contact glass to the glass support portion of the support base.

For the conventional scanner described above, the document reading unit must be disassembled when a defect is found in the document reading unit during the manufacturing process, or when a failure occurs in the image sensor.

Further, for a conventional document reading unit, when a comparatively large contact glass, one that extends 50 to 60 mm in the direction in which documents are conveyed and is about 1 m wide, is to be separated from the glass support portion of the support base, the strength of the adhesion provided by the double-sided adhesive tape makes it very difficult to peel the outer edge of the contact glass away from the glass support portion of the support base.

SUMMARY OF THE INVENTION

The objectives of the present invention are, therefore, to provide a document reading unit, wherein a document support plate, which covers an image sensor, can easily be removed from an opening in a support base, a scanner and an image forming apparatus.

To achieve these objectives, according to one aspect of the invention, a document reading unit comprises:

an image sensor, for reading a document;

a support base having a box-like shape, for internally accommodating and supporting the image sensor, and an opening through which the image sensor faces a document;

a document support plate that is located at the opening, for covering the image sensor and supporting a document that is being conveyed to the image sensor;

plate support members linked with the document support plate and arranged on the support base, for supporting the document support plate; and fixing portions, for detachably fixing the plate support members to the support base.

According to the document reading unit of the invention having the above configuration, when the document support plate fixed to the opening in the support base is to be removed, only the plate support members need be released from the support base at the fixing portions, for the document support plate, together with the plate support members, to be easily removed from the opening.

Further, for the document reading unit according to the invention, it is preferable that fixing members for engaging a document sliding face of the document support plate and securing the document support plate be located at both side ends of the document support plate, outside the document conveying area and parallel to the direction in which a document is conveyed. By employing the fixing members, the conveying of a document is not interrupted, the raising of the document support plate from the opening in the support base is prevented, and the reliability of the reading operation performed by the image sensor is ensured.

Furthermore, according to another aspect of the invention, a document reading unit includes:

spacers located between line sensors and a document support plate; and pressing members, for pressing the line sensors toward the document support plate. With this arrangement a predetermined distance between each line sensor and a document supported on the document support plate is maintained by the spacers, and the positions of the line sensors are adjusted to maintain predetermined focal distances.

In addition, for the document reading unit of the invention, the plate support members may be arranged at the longitudinal ends of each of the line sensors. Thus, since the plate support members are located near the pressing members, the document support plate provided for the opening of the support base can be coupled with the plate support members located near the pressing members, so that the urging force exerted by the pressing members can be prevented from raising the document support plate from the opening.

A scanner according to the invention comprises:

a document reading unit according to the invention; and a conveying unit for conveying a document to an image sensor for a document reading unit.

An image forming apparatus according to the invention comprises: the document reading unit of the invention described above, wherein an image is formed based on data for a document read by the document reading unit.

As described above, according to the present invention, since the plate support members arranged in the support base are coupled with the document support plate, the document support plate can be easily removed from the opening in the support base.

DETAILED DESCRIPTION OF THE PREFERRED EMBODIMENT

A specific embodiment of the present invention will now be described while referring to the accompanying drawings.

Figure 1:
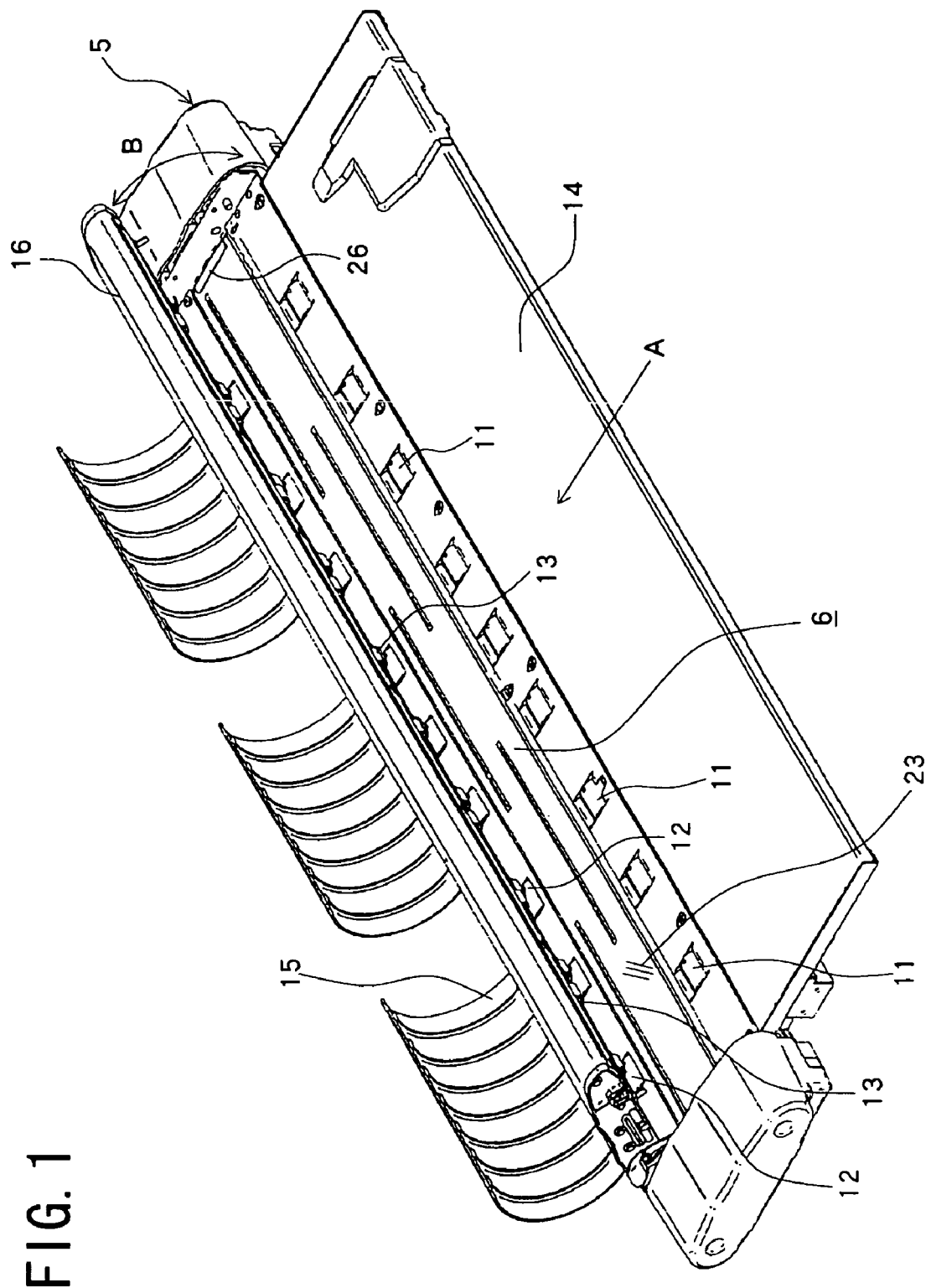
FIG. 1 is a perspective view of a scanner according to the present invention.

As shown in FIG. 1, a scanner includes: a conveying unit 5, for conveying a document; and a document reading unit 6, for reading a document that is conveyed by the conveying unit 5.

The conveying unit 5 includes: feed rollers 11, for feeding a document to the document reading unit 6; delivery rollers 12, for the delivery, from the document reading unit 6, of a document; pinch rollers 13, for pinching a document between the feed rollers 11 and the delivery rollers 12; a feed tray 14, on which documents are stacked; a delivery tray 15, on which documents read by the document reading unit 6 are stacked; and a drive mechanism (not shown), which rotates the feed rollers 11 and the delivery rollers 12.

The feed rollers 11 are located upstream relative to the conveying direction for the document reading unit 6, the delivery rollers 12 are located downstream relative to the conveying direction for the document reading unit 6, and the pinch rollers 13 are located opposite the feed rollers 11 and the delivery rollers 12. Also, the pinch rollers 13 are supported by a cover member 16 that covers a document conveying path and can be moved in directions indicated by an arrow B in FIG. 1, i.e., so that they are either near or separated from the feed rollers 11 and the delivery rollers 12.

Figure 2:
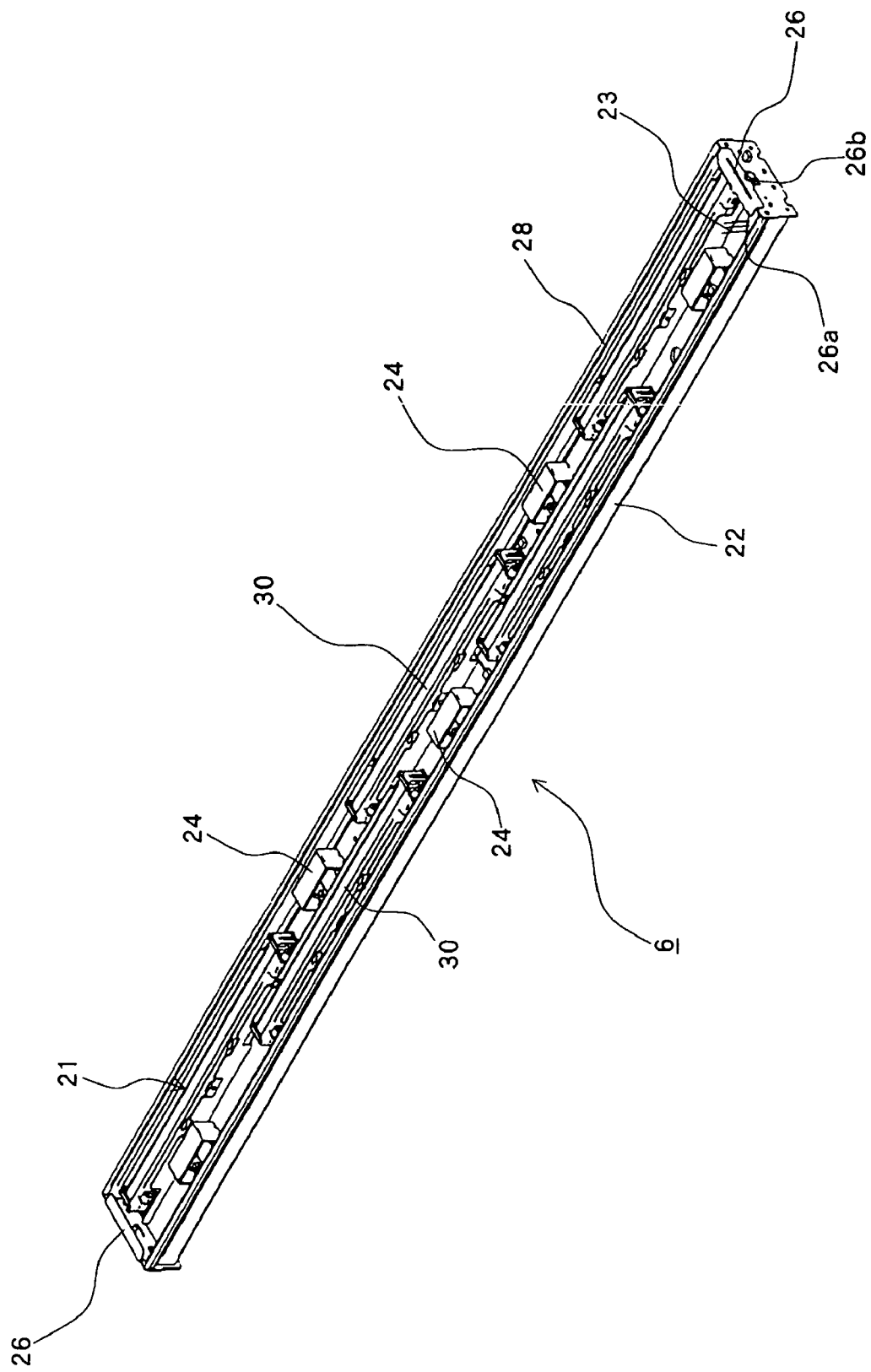
FIG. 2 is a perspective view of a document reading unit.
Figure 3:
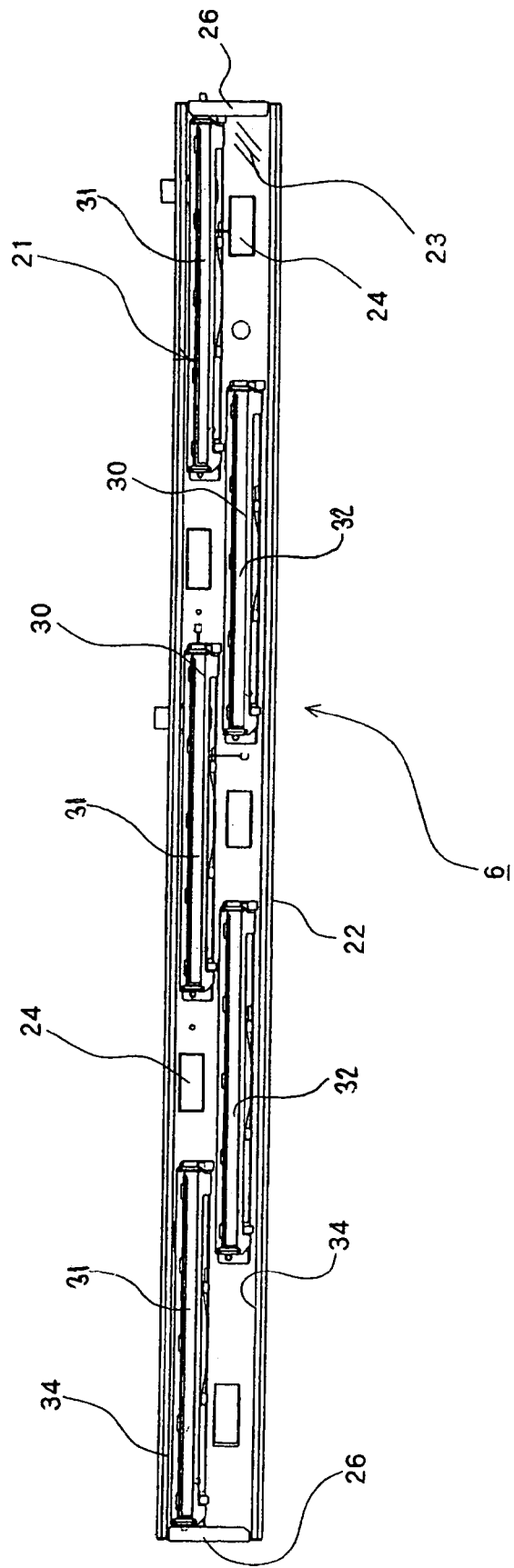
FIG. 3 is a plan view of the document reading unit.
Figure 4:
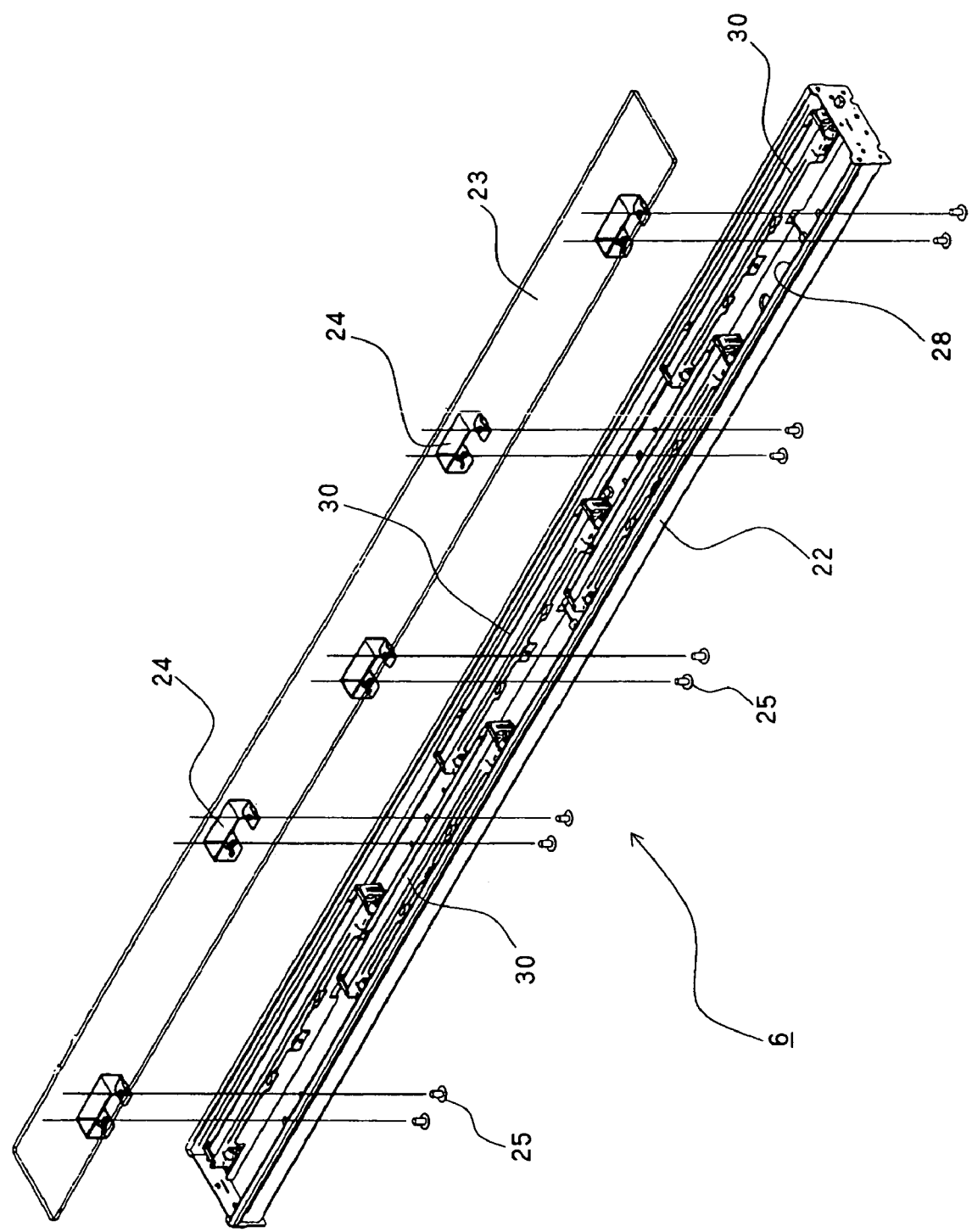
FIG. 4 is an exploded perspective view of the document reading unit.

As shown in FIGS. 2, 3 and 4, the document reading unit 6 includes: an image sensor 21, for reading a document; a support base (enclosure) 22, having a box-like shape and a finite depth, in which the image sensor 21 is internally stored and mounted; and a contact glass 23, which is a document support plate for supporting a document that is conveyed by the conveying unit 5.

The document reading unit 6 also includes: glass support members 24, which support the contact glass 23; fasteners in the form of fixing screws 25, which are used to detachably secure the glass support members 24 to the support base 22; and fixing plates 26, which fix both longitudinal side ends of the contact glass 23 to the support base 22.

The image sensor 21 has a first sensor array 31 and a second sensor array 32, each formed of multiple line sensors 30 arranged in rows in the widthwise direction of a document. The line sensors 30 in each row are longitudinally spaced apart from one another and staggered with respect to the line sensors 30 in the other row.

On the support base 22, the individual line sensors 30 are arranged at predetermined intervals in the longitudinal direction, parallel to the widthwise direction of a document. An opening 28 having a rectangular shape is formed so that, through the opening 28, the individual line sensors 30 face a document that is supported on the contact glass 23. The opening 28 of the support base 22 is closed by the contact glass 23, and the line sensors 30 are covered by the contact glass 23.

Figure 5:
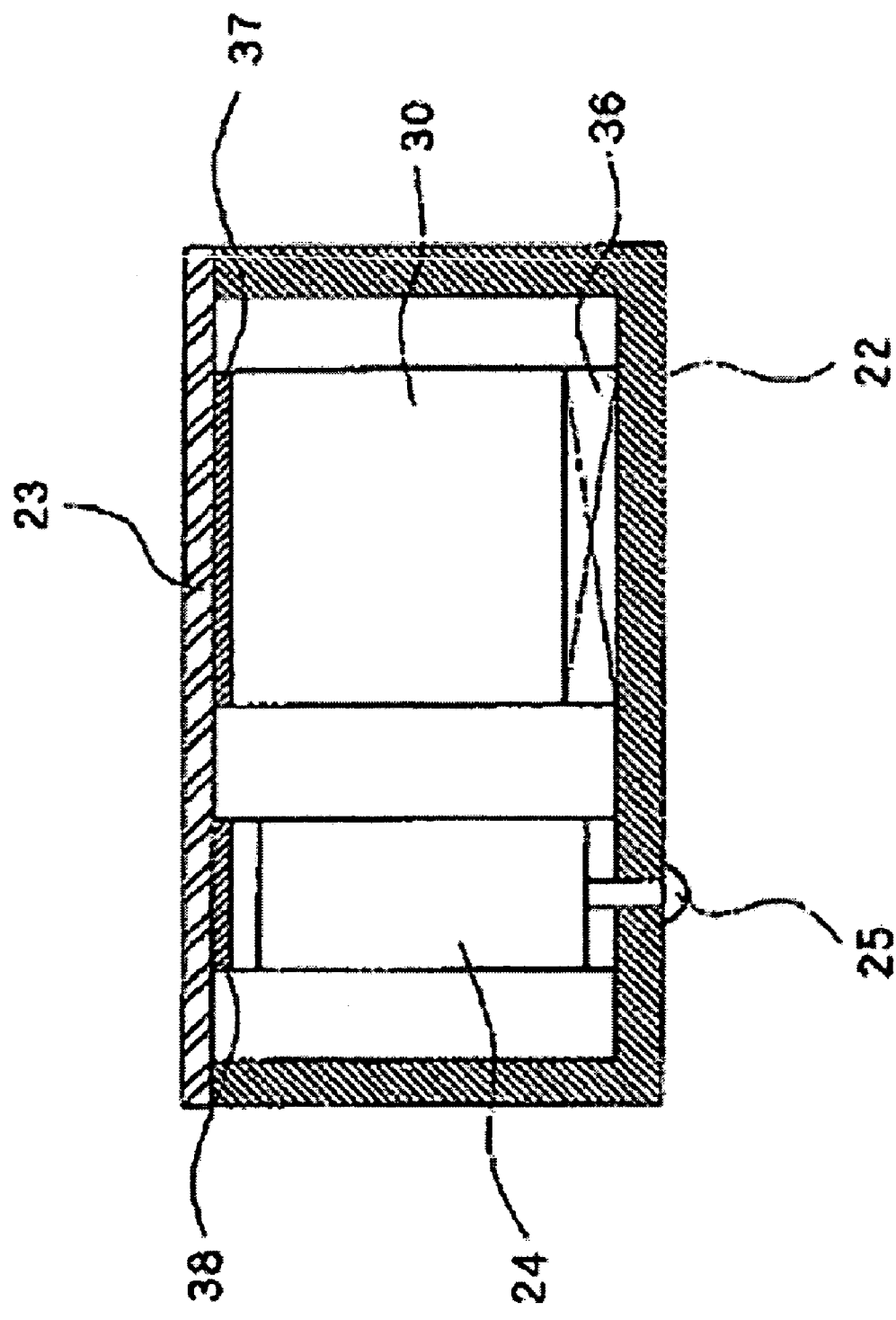
FIG. 5 is a cross-sectional view for explaining the state wherein a contact glass is supported by a glass support member.

Further, on the support base 22, as shown in FIG. 5, helical compression springs 36, which are pressing means provided for urging each line sensor 30 toward the contact glass 23, are arranged at positions corresponding to the longitudinal ends of the line sensors 30. In addition, a spacer 37, for obtaining a predetermined focal distance from a document placed on the document sliding face of the contact glass 23, is provided at one end face of each line sensor 30. Thus, one end of each of the line sensors 30 provided on the support base 22 is pressed against a spacer 37 that, in turn, is pressed against the reverse face of the document sliding face of the contact glass 23 by the resilient force exerted by a helical compression spring 36.

The contact glass 23 is formed like a flat rectangular plate, e.g., the length of each short side, which is parallel to the direction in which a document is conveyed, is about 50 to 60 mm, the length of each long side, which is perpendicular to the direction in which a document is conveyed, is about 1000 mm, and the thickness is about 2 to 3 mm. In this embodiment, the contact glass 23 is compatible with a document width, for example, of up to 36 inches (914 mm).

Glass support portions 34 are formed at the edges of the opening 28 of the support base 22 in the widthwise direction of a document, and support the contact glass 23 by holding its outer longitudinal edges.

The glass support members 24 are made, for example, of metal plate, and are positioned, in the widthwise direction of a document, at longitudinal ends of each line 10 sensor 30. As illustrated in FIGS. 3 and 4, the glass support members 24 are disposed, respectively, between each adjacent pair of line sensors 30 in each row of line sensors.

As shown in FIG. 5, one end face of each glass support member 24 is bonded to and coupled with the reverse face (underside) of the document sliding face of the contact glass 23 by adhesive means, such as double-sided adhesive tape 38. 15 The other end face of the glass support member 24 is detachably fixed to the support base 22 by fixing screws 25, for example.

Therefore, since the contact glass 23 that closes the opening 28 of the support base 22 is adhered to the glass support members 24 located near the helical compression springs 36, the raising of the contact glass 23 from the opening 28 by the urging force exerted by the helical compression springs 36 is prevented, and the contact glass 23 is appropriately attached to the opening 28.

Although not shown, the glass support members 24 may be integrally formed with the contact glass 23.

As shown in FIGS. 2 and 3, fixing plates 26, which are, for example, metal plates, L-shaped in cross section, are located outside a document conveying area and are fixed by screws at both longitudinal ends of the contact glass 23. Each of the fixing plates 26 has an engagement piece 26a that engages the document sliding face of the contact glass 23 and a fixing piece 26b that is secured to a side face of the support base 22.

An explanation will now be given for the operation performed for the thus arranged document reading unit 6 to remove the contact glass 23 from the support base 22. First, for the document reading unit 6, when the contact glass 23 is to be removed from the support base 22, the fixing plates 26 that secure the two longitudinal ends of the contact glass are removed. Then, the fixing screws 25 that fix the glass support members 24 to the support base 22 are removed, so that the contact glass 23 can be easily removed from the support base 22, together with the attached glass support members 24.

In the above described scanner, using the feed rollers 11 and the pinch rollers 13 of the conveying unit 5, a document is conveyed from the feed tray 14 in the direction indicated by the arrow A in FIG. 1 and is read by the image sensor 21 of the document reading unit 6. Once a document has been read by the document reading unit 6, it is discharged to the delivery tray 15 using the delivery rollers 12 and the pinch rollers 13 of the conveying unit 5.

The scanner is electrically connected to an electronic apparatus, such as a personal computer or an image forming apparatus, and outputs to this electronic apparatus data read by the document reading unit 6, which the electronic apparatus employs to record an image on a recording sheet.

As described above, since the document reading unit 6 of the scanner includes the glass support members 24 that support the contact glass 23, only the fixing plates 26 and the fixing screws 25 need be removed when the contact glass 23 is to be removed from the opening 28 of the support base 22. Thus, the contact glass 23 can easily be removed from the opening 28 of the support base 22, together with the glass support members 24. That is, according to the document reading unit 6, when the contact glass is to be removed from the support base, unlike the conventional case, the adhesive layer of double-sided adhesive tape need not be removed, and for the adjustment and the exchange of the image sensor, the work efficiency, for example, can be improved.

For the conveying unit 5 of the scanner of the present invention, a so-called rear sheet discharge system is provided whereby a document, fed-into the document reading unit 6, is discharged in the same direction as that in which conveying is performed. However, a so-called front sheet discharge system, whereby a document fed into the document reading unit is discharged in the direction opposite to that in which conveying is performed, may of course be employed.

What is claimed is:

1. A document reading unit comprising:
    an image sensor for reading a document, the image sensor including a plurality of sensor arrays each formed of multiple line sensors arranged in a widthwise direction perpendicular to a direction in which the document is conveyed;
    a support base having a box-like shape for internally accommodating and supporting the image sensor, and an opening through which the image sensor faces the document;
    a document support plate that is located at the opening for covering the image sensor and supporting the document while it is being conveyed to the image sensor;
    plate support members linked with the document support plate and arranged on the support base at the longitudinal ends of each of the line sensors for supporting the document support plate;
    fixing portion for detachably fixing the plate support members to the support base;
    spacers located between the line sensors and the document support plate; and
    pressing members for pressing the line sensors toward the document support plate.

2. A document reading unit according to claim 1; wherein fixing members for engaging a document sliding face of the document support plate and securing the document support plate are located at both side ends of the document support plate, outside the document conveying area and parallel to the direction in which the document is conveyed.

3. A document reading unit according to claim 1; wherein the plate support members are bonded to reverse face of a document sliding face of the document support plate.

4. A document reading unit according to claim 1; wherein the plate support members are integrally formed with the document support plate.

5. A document reading unit according to claim 1; wherein the fixing portions comprise fixing screws that detachably secure the plate support members to the support base.

6. A scanner comprising:
    a document reading unit according to claim 1; and
    a conveying unit for conveying a document to an image sensor in the document reading unit.

7. An image forming apparatus comprising:
    a document reading unit according to claim 1,
    wherein an image is formed based on data for a document read by the document reading unit.

8. A document reading unit comprising:
    an image sensor having two rows of line sensors for reading a document, the line sensors in each row being longitudinally spaced apart from one another and staggered with respect to the line sensors in the other row;
    an enclosure that accommodates and supports therein the image sensor, the enclosure having an opening through which the image sensor faces a document to be read;
    a document support plate that is located at the opening and overlies the image sensor and that supports the document while it is being read;
    plate support members coupled to the document support plate and disposed, respectively, between adjacent pairs of line sensors in each row of line sensors; and
    fasteners that detachably fasten the plate support members to the enclosure to enable removal of the document support plate and the plate support members, as a unit, from the enclosure.

9. A document reading unit according to claim 8; wherein the plate support members are bonded to an underside of the document support plate.

10. A document reading unit according to claim 8; wherein the plate support members are adhered to an underside of the document support plate by double-sided adhesive tape.

11. A document reading unit according to claim 8; wherein the fasteners comprise screws.

12. A document reading unit according to claim 8; wherein the document support plate comprises a glass plate.

13. A document reading unit according to claim 8; further comprising spacers disposed between the document support plate and respective ones of the line sensors.

14. A document reading unit according to claim 13; further comprising resilient pressing members for pressing the line sensors toward the document support plate.

15. A document reading unit according to claim 8; wherein one plate support member is disposed between each adjacent pair of line sensors in each row of line sensors.

16. A document reading unit according to claim 15; further comprising spacers disposed between the document support plate and respective ones of the line sensors.

17. A document reading unit according to claim 16; further comprising resilient pressing members for pressing the line sensors toward the document support plate.

18. A document reading unit according to claim 17; wherein the plate support members are bonded to an underside of the document support plate.

19. A scanner comprising:

a document reading unit according to claim 8: and a conveying unit for conveying a document along the document support plate to be read by the image sensor of the document reading unit.

* * * * *